June 25, 1963  J. H. LEONARD ETAL  3,095,524
PANELBOARD ADAPTER
Filed March 29, 1960  2 Sheets-Sheet 1
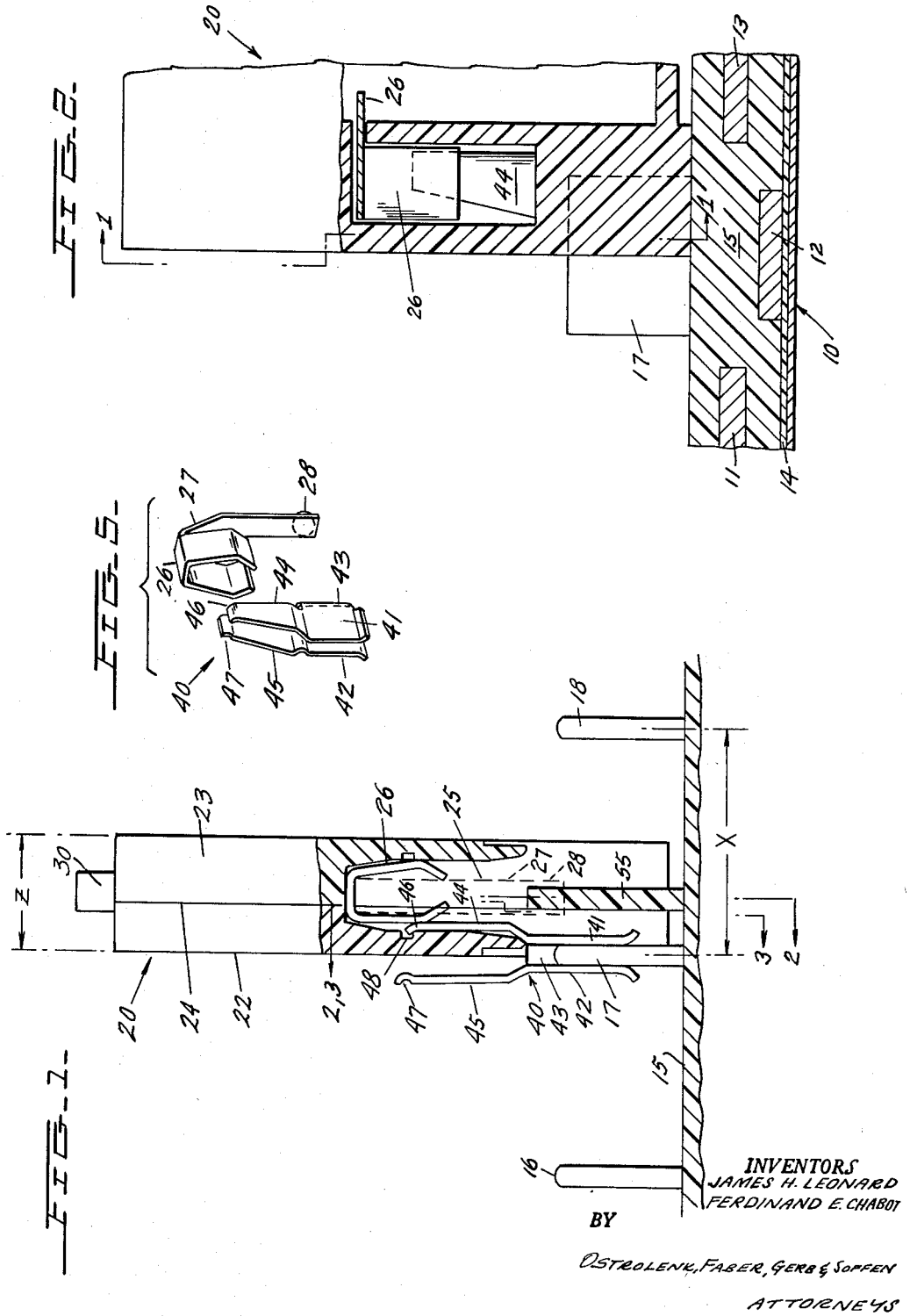
INVENTORS
JAMES H. LEONARD
FERDINAND E. CHABOT
BY
OSTROLENK, FABER, GERB & SOFFEN
ATTORNEYS June 25, 1963  J. H. LEONARD ETAL  3,095,524
PANELBOARD ADAPTER
Filed March 29, 1960  2 Sheets-Sheet 2
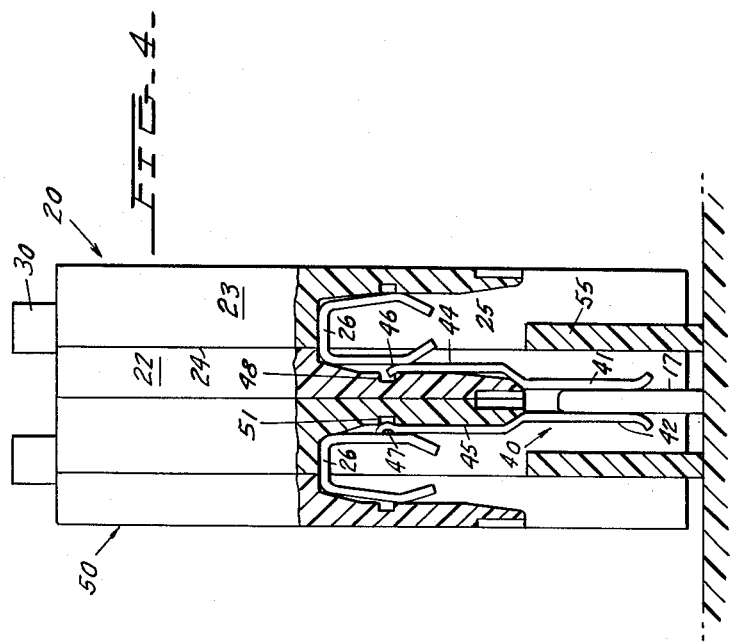
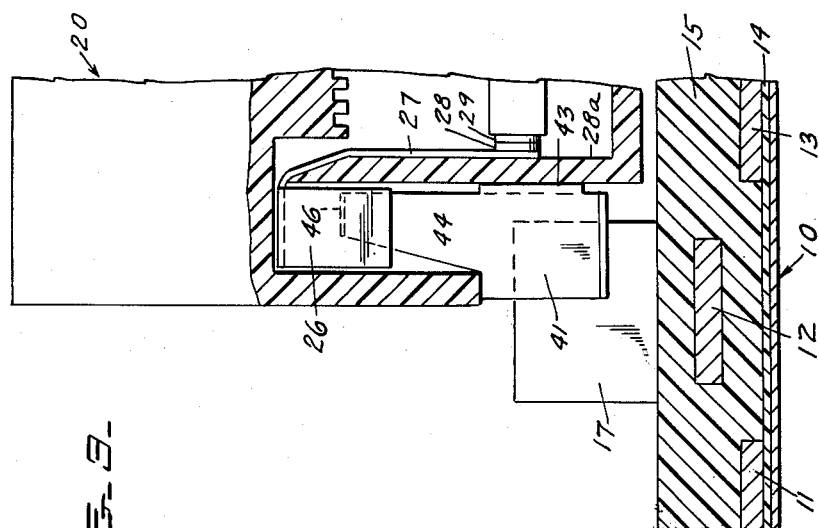
INVENTORS
JAMES H. LEONARD
FERDINAND E. CHABOT
BY
OSTROLENK, FABER, GERB & JOFFEN
ATTORNEYS United States Patent Office 3,095,524
Patented June 25, 1963

3,095,524
PANELBOARD ADAPTER
James H. Leonard, Clifton Heights, Pa., and Ferdinand E. Chabot, Pasadena, Calif., assignors to I-T-E Circuit Breaker Company, Philadelphia, Pa., a corporation of Pennsylvania
Filed Mar. 29, 1960, Ser. No. 18,411
17 Claims. (Cl. 317—117)

The instant invention is related to means for electrically connecting a circuit breaker of a given width to a panelboard constructed to receive circuit breakers of greater width.

In recent years it has been the practice to construct panelboards for home and light industrial applications in a manner such that the panelboards are adapted to receive circuit breakers whose widths are one inch or multiples thereof. More recently, half inch width circuit breakers have made their appearance on the market.

While panelboards may be constructed specifically to utilize breakers of half inch width, it is highly desirable to utilize existing panelboards adapted for one inch wide breakers. In addition, it is desirable to construct a single panelboard which utilizes a combination of half inch and one inch wide breakers substantially interchangeably.

The prior art utilizes existing panelboards with narrow type circuit breakers by positioning two independently operable circuit breaker units in a single one inch wide housing and providing a common line terminal for both circuit breaker units. With this arrangement if there is a mechanical or electrical failure in one of the circuit breaker units a replacement of the unit entails a replacement of two circuit breaker units.

Further, in the original construction the ratings of the pole units must be established. That is, once the circuit breaker units are mounted to the single housing if the rating of one circuit is changed then an entirely new circuit breaker comprising two poles must be changed.

In order to overcome the problems outlined above the instant invention provides an adapter means which can be utilized with two narrow circuit breakers each of which is provided with its own housings. The adapter means may be placed between two circuit breakers to form a duplex breaker or may be placed on either the right or left side of a single breaker so that this breaker may be utilized individually in the panelboard. Thus, extreme flexibility is achieved in that there are two separate and independent circuit breakers which can be clipped together in any combination of ratings after the individual circuit breakers are completed.

The adapter means comprises a clip which can be applied to the circuit breakers at the point of installation. The adapter is mounted to the circuit breaker in a manner such that it is removable therefrom yet will be removed from the panelboard when the circuit breaker is removed from the panelboard. Thus, it is not necessary to grope in the region of the panelboard bus bars in order to recover a clip which has remained in engagement with a bus bar stab which defines a circuit location.

Accordingly, a primary object of the instant invention is to provide a novel means for adapting a narrow circuit breaker for installation in a panelboard constructed to receive wide circuit breakers.

Another object is to provide a panelboard adapter means which will automatically connect either one or both of two circuit breaker units for mounting to a panelboard.

Still another object is to provide a removable adapter means between a circuit breaker and panelboard with the adapter means being constructed to be retained by the circuit breaker as it is removed from the panelboard.

These as well as other objects of the instant invention shall become readily apparent after reading the following description of the accompanying drawings in which:

FIGURE 1 is a line end view of a single circuit breaker mounted to a panelboard with the circuit breaker shown sectionalized along the portion defined by line 1—1 of FIGURE 2 so as to reveal the adapter means connection between the circuit breaker line terminal and the panelboard.

FIGURES 2 and 3 are fragmentary cross-sections taken through lines 2—2 and 3—3, respectively, of FIGURE 1 looking in the directions of the respective arrows.

FIGURE 4 is a line end view similar to FIGURE 1 showing two adjacent circuit breakers electrically connected in the panelboard by utilizing a single adapter means.

FIGURE 5 is an exploded perspective of the adapter means circuit breaker line terminal combination.

Now referring to the figures, panelboard 10 is of the type shown in copending application Serial No. 626,442, filed December 5, 1956, entitled "Selective Mounting for Circuit Interrupters," with W. H. Edmunds as the inventor and assigned to the assignee of the instant invention.

Briefly, panelboard 10 comprises three spaced parallel bus bars 11–13 maintained in insulating relationship by insulating sheet member 14 and molded insulating block 15. Block 15 also provides means for spacing male stabs 16–18 which are electrically connected to bus bars 11–13, respectively. Stabs 16–18 define circuit locations which are evenly spaced apart by distance X which in a typical design is equal to approximately one inch.

Circuit breaker 20 is comprised of a housing 21 formed of mating sections 22, 23 joined along line 24. The cooperation of housing sections 22, 23 forms a chamber 25 wherein line terminal 26 is disposed.

Line terminal 26 is comprised of conducting spring material which is formed in a modified inverted U-shape with the arms of the U occupying substantially the full width of chamber 25. Conductor 27, formed integrally with line terminal 26, extends along partition 28a on the surface thereof exteriorly of chamber 25. Stationary contact 28 is mounted to the free end of conductor 27 and is operatively positioned so as to be engaged by movable contact 29 when circuit breaker 20 is operated to the closed position by its manual operating handle 30.

Since the operative connections between handle 30 and movable contact 29 form no part of the instant invention they will not be described herein. However, reference is made to U.S. Patent No. 2,678,359 for a description of a suitable circuit breaker operating mechanism.

Adapter means 40 electrically connects line terminal 26 to panelboard stab 17. Adapter means 40 comprises a member constructed of conducting spring material formed with a first portion including parallel jaws 41, 42 joined along their back edges by connecting portions 43. The lower edges of jaws 41, 42 are flared outwardly so that stab 17 may readily be received therebetween.

Adapter means 40 further includes a second portion 44 and a third portion 45 which extend upwardly from jaws 41, 42, respectively. Adapter means portions 44, 45 are substantially parallel to each other and at the upper ends thereof are provided with projections 46, 47, respectively. Projection 46 is hook-like and extends toward portion 45 while projection 47 is a smooth embossment extending toward portion 44.

Adapter means portion 44 is disposed within terminal chamber 25 with hook-like projection 46 entered into housing depression 48 formed within chamber 25. When a single circuit breaker 20 is mounted to panelboard 10, as illustrated in FIGURE 1, adapter means portion 45 is not disposed within the circuit breaker housing.

When circuit breaker 20 is assembled at the factory adapter means 40 is usually not mounted thereto. Mounting of adapter means 40 is accomplished by merely inserting adapter means portion 44 into chamber 25 along the chamber wall formed by housing portion 22. As this is done the left hand arm (with respect to FIGURE 1) of line terminal 26 is deflected to the right and a spring loading action takes place such that when hook-like projection 46 is aligned with depression 48 the left hand terminal arm will be in frictional engagement with adapter means section 44 and force projection 46 into depression 48. This mounts adapter means 40 to circuit breaker 20 in a manner such that as circuit breaker 20 is removed from panelboard 10 adapter means 40 moves with circuit breaker 20 and is disengaged from stab 17.

As best seen in FIGURE 4, the same adapter means 40 may be utilized to electrically connect a second circuit breaker 50 to panelboard 10. Circuit breaker 50 is of substantially the same construction as circuit breaker 20 so that a description thereof is not necessary for the purposes of this case. When circuit breaker 50 is mounted to the left hand side (with respect to FIGURE 1) of circuit breaker 20 adapter means portion 45 is disposed within the terminal chamber of circuit breaker 50 with embossment 47 being disposed within chamber depression 41. Portion 45 is in frictional engagement with the right hand arm of the line terminal of circuit breaker 50. The smooth embossment 47 cooperating with depression 51 provides means whereby the mechanical connection between adapter means 40 and circuit breaker 50 may readily be severed.

Housing portion 23 is provided with a wall 55 which is substantially centered with respect to the width Z of circuit breaker 20. Wall 55 is positioned below the bottom opening of chamber 25 and provides an insulating barrier means between adjacent adapter means 40. It is to be noted that two of these barriers 55 will be interposed between adjacent stabs 16 and 17, 17 and 18, etc., so that two barriers are interposed between adjacent adapter means 40.

Thus, even though panelboard 10 is constructed with stabs 16–18 spaced apart by distance X, which corresponds to the width of a relatively wide circuit breaker, narrow circuit breakers 20 and 50 may be mounted to panelboard 10 by utilizing adapter means 40. It is to be noted that the width Z of circuit breakers 20 and 50 is approximately one-half of the distance X. That is in a typical installation X equals one inch while Z equals substantially one-half inch.

Although we have here described preferred embodiment of our novel invention, many variations and modifications will now be apparent to those skilled in the art, and we therefore prefer to be limited, not by the specific disclosure herein, but only by the appending claims.

We claim:

1. A circuit breaker including a housing and a terminal member; said housing including an internal chamber communicating with an area external of said housing; said terminal member being disposed within said chamber; adapter means including a first portion for engaging a panelboard bus bar, a second portion and a third portion substantially parallel to said second portion; said second portion being entered into said chamber in frictional engagement with said terminal member; said third portion being disposed externally of said housing.

2. A circuit breaker including a housing and a terminal member; said housing including an internal chamber communicating with an area external of said housing; said terminal member being disposed within said chamber; adapter means including a first portion for engaging a panelboard bus bar, a second portion and a third portion substantially parallel to said second portion; said second portion being entered into said chamber in frictional engagement with said terminal member; said third portion being disposed externally of said housing; said second and said third portions each having a projection extending toward one another; said housing having a depression therein at a portion thereof defining said chamber; said second portion projection being entered into said depression for retention of said adapter means to said circuit breaker.

3. A circuit breaker including a housing and a terminal member; said housing including an internal chamber communicating with an area external of said housing; said terminal member being disposed within said chamber; adapter means including a first portion for engaging a panelboard bus bar, a second portion and a third portion substantially parallel to said second portion; said second portion being entered into said chamber in frictional engagement with said terminal member; said third portion being disposed externally of said housing; said second and said third portions each having a projection extending toward one another; said housing having a depression therein at a portion thereof defining said chamber; said second portion projection being entered into said depression for retention of said adapter means to said circuit breaker; said second portion projection comprising a hook-like means.

4. A circuit breaker including a housing and a terminal member; said housing including an internal chamber communicating with an area external of said housing; said terminal member being disposed within said chamber; adapter means including a first portion for engaging a panelboard bus bar, a second portion and a third portion substantially parallel to said second portion; said second portion being entered into said chamber in frictional engagement with said terminal member; said third portion being disposed externally of said housing; said second and said third portions each having a projection extending toward one another; said housing having a depression therein at a portion thereof defining said chamber; said second portion projection being entered into said depression for retention of said adapter means to said circuit breaker; said second portion projection comprising a hook-like means; said third portion projection comprising a smooth embossment.

5. A first and a second circuit breaker each having an individual housing and an individual terminal member; each of said housings including an internal chamber communicating with an area external of said housings; each of said terminal members being disposed within the chamber of its respective circuit breaker; adapter means including a first portion for engaging a panelboard bus bar, a second portion and a third portion; each of said second and said third portions extending in the same direction from said first portion; said second portion being entered into the chamber of said first circuit breaker in engagement with the terminal member thereof; said third portion being entered into the chamber of said second circuit breaker in engagement with the terminal member thereof.

6. A first and a second circuit breaker each having an individual housing and an individual terminal member; each of said housings including an internal chamber communicating with an area external of said housings; each of said terminal members being disposed within the chamber of its respective circuit breaker; adapter means including a first portion for engaging a panelboard bus bar; a second portion and a third portion; each of said second and said third portions extending in the same direction from said first portion; said second portion being entered into the chamber of said first circuit breaker in engagement with the terminal member thereof; said third portion being entered into the chamber of said second circuit breaker in engagement with the terminal member thereof; said adapter means and said terminal members being frictionally engaged.

7. A first and a second circuit breaker each having an individual housing and an individual terminal member; each of said housings including an internal chamber communicating with an area external of said housings; each of said terminal members being disposed within the chamber of its respective circuit breakers; adapter means including a first portion for engaging a panelboard bus bar, a second portion and a third portion; each of said second and said third portions extending in the same direction from said first portion; said second portion being entered into the chamber of said first circuit breaker in engagement with the terminal member thereof; said third portion being entered into the chamber of said second circuit breaker in engagement with the terminal member thereof; said adapter means and said terminal members being frictionally engaged; said second and said third portions each having a projection extending toward one another; each of said housings having depressions therein at portions thereof defining the chambers; said second and said third portion projections being entered into the depression of said first and said second circuit breakers, respectively, for retention of said adapter means to said circuit breakers in a predetermined position.

8. A first and a second circuit breaker each having an individual housing and an individual terminal member; each of said housings including an internal chamber communicating with an area external of said housings; each of said terminal members being disposed within the chamber of its respective circuit breaker; adapter means including a first portion for engaging a panelboard bus bar, a second portion and a third portion; each of said second and said third portions extending in the same direction from said first portion; said second portion being entered into the chamber of said first circuit breaker in engagement with the terminal member thereof; said third portion being entered into the chamber of said second circuit breaker in engagement with the terminal member thereof; said adapter means and said terminal members being frictionally engaged; said second and said third portions each having a projection extending toward one another; each of said housings having depressions therein at portions thereof defining the chambers; said second and said third portion projections being entered into the depression of said first and said second circuit breakers, respectively, for retention of said adapter means to said circuit breakers in a predetermined position; said second portion projection comprising a hook-like means.

9. A first and a second circuit breaker each having an individual housing and an individual terminal member; each of said housings including an internal chamber communicating with an area external of said housings; each of said terminal members being disposed within the chamber of its respective circuit breaker; adapter means including a first portion for engaging a panelboard bus bar, a second portion and a third portion; each of said second and said third portions extending in the same direction from said first portion; said second portion being entered into the chamber of said first circuit breaker in engagement with the terminal member thereof; said third portion being entered into the chamber of said second circuit breaker in engagement with the terminal member thereof; said adapter means and said terminal members being frictionally engaged; said second and said third portions each having a projection extending toward one another; each of said housings having depressions therein at portions thereof defining the chambers; said second and said third portion projections being entered into the depression of said first and said second circuit breakers, respectively, for retention of said adapter means to said circuit breakers in a predetermined position; said second portion projection comprising a hook-like means; said third portion projection comprising a smooth embossment.

10. A first and a second circuit breaker each having an individual housing and an individual terminal member; each of said housings including an internal chamber communicating with an area external of said housings; each of said terminal members being disposed within the chamber of its respective circuit breaker; adapter means including a first portion for engaging a panelboard bus bar; a second portion and a third portion; each of said second and said third portions extending in the same direction from said first portion; said second portion being entered into the chamber of said first circuit breaker in engagement with the terminal member thereof; said second portion being entered into the chamber of said second circuit breaker in engagement with the terminal member thereof; said adapter means and said terminal members being frictionally engaged; said second and said third portions being substantially parallel to each other and each having projections extending toward one another for engaging a circuit breaker housing formation and retaining said adapter means to a circuit breaker.

11. A first and a second circuit breaker each having an individual housing and an individual terminal member; each of said housings including an internal chamber communicating with an area external of said housings; each of said terminal members being disposed within the chamber of its respective circuit breaker; adapter means including a first portion for engaging a panelboard bus bar, a second portion and a third portion; each of said second and said third portions extending in the same direction from said first portion; said second portion being entered into the chamber of said first circuit breaker in engagement with the terminal member thereof; said second portion being entered into the chamber of said second circuit breaker in engagement with the terminal member thereof; said adapter means and said terminal members being frictionally engaged; said second and said third portions being substantially parallel to each other and each having projections extending toward one another for engaging a circuit breaker housing formation and retaining said adapter means to a circuit breaker; said second portion projection comprising a hook-like means.

12. A first and second circuit breaker each having an individual housing and an individual terminal member; each of said housings including an internal chamber communicating with an area external of said housings; each of said terminal members being disposed within the chamber of its respective circuit breaker; adapter means including a first portion for engaging a panelboard bus bar, a second portion and a third portion; each of said second and said third portions extending in the same direction from said first portion; said second portion being entered into the chamber of said first circuit breaker in engagement with the terminal member thereof; said second portion being entered into the chamber of said second circuit breaker in engagement with the terminal member thereof; said adapter means and said terminal members being frictionally engaged; said second and said third portions being substantially parallel to each other and each having projections extending toward one another for engaging a circuit breaker housing formation and retaining said adapter means to a circuit breaker; said second portion projection comprising a hook-like means; said third portion projection comprising a smooth embossment.

13. The combination comprising bus bar means, means associated with said bus bars defining circuit breaker locations spaced a predetermined distance apart, a circuit breaker including a housing and a terminal member positioned internally of said housing and centered with respect to the width of said housing; said width being approximately half of said predetermined distance; adapter means electrically connecting said circuit breaker to said bus bar means; said adapter means comprising a first portion in engagement with the means defining the circuit breaker locations; a second portion and a third portion extending in the same direction from said first portion; said second portion being disposed within said housing in engagement with said terminal member; said third portion being disposed externally of said housing; said third portion constructed and positioned to engage a line terminal of a circuit breaker mounted adjacent to said first recited circuit breaker.

14. The combination comprising bus bar means, means associated with said bus bars defining circuit breaker locations spaced a predetermined distance apart, a circuit breaker including a housing and a terminal member positioned internally of said housing and centered with respect to the width of said housing; said width being approximately half of said predetermined distance; adapter means electrically connecting said circuit breaker to said bus bar means; said adapter means comprising a first portion in engagement with the means defining the circuit breaker locations; a second portion and a third portion extending in the same direction from said first portion; said second portion being disposed within said housing in engagement with said terminal member; said third portion being disposed externally of said housing; said third portion constructed and positioned to engage a line terminal of a circuit breaker mounted adjacent to said first recited circuit breaker; said second portion having a hook-like projection disposed within an internal depression of said housing whereby said adapter means is captively mounted to said circuit breaker.

15. The combination comprising bus bar means, means associated with said bus bars defining circuit breaker locations spaced a predetermined distance apart, a first circuit breaker including a housing and a terminal member positioned internally of said housing and centered with respect to the width of said housing; said width being approximately half of said predetermined distance; adapter means electrically connecting said first circuit breaker to said bus bar means; said adapter means comprising a first portion in engagement with the means defining the circuit breaker locations, a second portion and a third portion extending in the same direction from said first portion; said second portion being disposed within said housing in engagement with said terminal member; said third portion being disposed externally of said housing; a second circuit breaker including a housing and terminal member constructed substantially as the housing and terminal member of said first circuit breaker; said third portion being disposed within the second circuit breaker housing in engagement with the circuit breaker terminal member disposed therein.

16. The combination comprising bus bar means, means associated with said bus bars defining circuit breaker locations spaced a predetermined distance apart, a first circuit breaker including a housing and a terminal member positioned internally of said housing and centered with respect to the width of said housing; said width being approximately half of said predetermined distance; adapter means electrically connecting said first circuit breaker to said bus bar means; said adapter means comprising a first portion in engagement with the means defining the circuit breaker locations, a second portion and a third portion extending in the same direction from said first portion; said second portion being disposed within said housing in engagement with said terminal member; said third portion being disposed externally of said housing; a second circuit breaker including a housing and terminal member constructed substantially as the housing and terminal member of said first circuit breaker; said third portion being disposed within the second circuit breaker housing in engagement with the circuit breaker terminal member disposed therein; said adapter means being frictionally engaged with said terminal members.

17. The combination comprising bus bar means, means associated with said bus bars defining circuit breaker locations spaced a predetermined distance apart, a first circuit breaker including a housing and a terminal member positioned internally of said housing and centered with respect to the width of said housing; said width being approximately half of said predetermined distance; adapter means electrically connecting said first circuit breaker to said bus bar means; said adapter means comprising a first portion in engagement with the means defining the circuit breaker locations, a second portion and a third portion extending in the same direction from said first portion; said second portion being disposed within said housing in engagement with said terminal member; said third portion being disposed externally of said housing; said second portion having a hook-like projection disposed within an internal depression of said housing whereby said adapter means is captively mounted to said first circuit breaker; a second circuit breaker including a housing and terminal member constructed substantially as the housing and terminal member of said first circuit breaker; said third portion being disposed within the second circuit breaker housing in engagement with the circuit breaker terminal member disposed therein; said third portion having a smooth embossment disposed within a depression of the second circuit breaker housing whereby said second circuit breaker is readily separated from said adapter means.

References Cited in the file of this patent

UNITED STATES PATENTS

| | | |
|---|---|---|
| 2,654,074 | Lancelot | Sept. 29, 1953 |
| 2,738,445 | Hammerly | Mar. 13, 1956 |
| 2,910,629 | Casey | Oct. 27, 1959 |

FOREIGN PATENTS

| | | |
|---|---|---|
| 581,831 | Great Britain | Oct. 25, 1946 |

OTHER REFERENCES

Federal Noark Catalog 1000A, July 1953, by Federal Pacific Electric Co., pages 1, 2 and 3.